United States Patent [19]

Bartel et al.

[11] Patent Number: 5,242,476
[45] Date of Patent: Sep. 7, 1993

[54] PROCESS FOR THE PREPARATION OF GLASS FIBER OPTICAL WAVEGUIDES WITH INCREASED TENSILE STRENGTH

[75] Inventors: Ulrich Bartel, Ludwigsburg; Bernd Lange, Kornwestheim, both of Fed. Rep. of Germany

[73] Assignee: Kabelmetal Electro GmbH, Fed. Rep. of Germany

[21] Appl. No.: 755,284

[22] Filed: Sep. 5, 1992

[30] Foreign Application Priority Data

Sep. 6, 1990 [DE] Fed. Rep. of Germany ....... 4028275

[51] Int. Cl.$^5$ ........................................... C03B 37/023
[52] U.S. Cl. ........................................ 65/3.11; 65/12; 65/13
[58] Field of Search ................ 65/2, 12, 3.11, 13, 65/3.12, 3.2

[56] References Cited

U.S. PATENT DOCUMENTS

| | | | |
|---|---|---|---|
| 4,184,860 | 1/1980 | Schneider et al. | 65/3.12 |
| 4,460,696 | 7/1984 | Harada et al. | 65/4.2 |
| 4,702,759 | 10/1987 | Roba | 65/3.11 |

FOREIGN PATENT DOCUMENTS

| | | |
|---|---|---|
| 2826010 | 1/1979 | Fed. Rep. of Germany . |
| 2419786 | 9/1979 | Fed. Rep. of Germany . |
| 2-201403 | 8/1990 | Japan . |

Primary Examiner—Robert L. Lindsay
Attorney, Agent, or Firm—Ware, Fressola, Van Der Sluys & Adolphson

[57] ABSTRACT

For the production of glass fiber optical waveguides with increased tensile strength, these are drawn from a glass preform with a single-layer or multi-layer of additional sheathing of a glass material, with the material of at least the outermost layer in each case having a lower coefficient of thermal expansion as compared with the layer located underneath it or with the material of the preform. During the drawing process, the fiber is drawn from the preform in the cold state with increased tensile force of 70 to 200 cN.

12 Claims, 1 Drawing Sheet

PROCESS FOR THE PREPARATION OF GLASS FIBER OPTICAL WAVEGUIDES WITH INCREASED TENSILE STRENGTH

BACKGROUND OF THE INVENTION

1. Field of the Invention

The present invention relates to a process for the preparation of glass fiber optical waveguides with increased tensile strength by drawing the waveguides from a glass preform with a single-layer or multi-layer additional sheathing of a glass material, with the material of at least the outermost layer in each case having a lower coefficient of thermal expansion as compared with the layer underneath it or with the material of the preform.

2. Description of the Prior Art

Processes of the above-mentioned type are known from DE OS 24 19 76. In the case of optical fibers consisting of a high-refraction core and low-refraction cladding, to improve the mechanical properties, there has already (DE OS 24 19 786) been arranged, over the cladding, a sheath whose coefficient of thermal expansion is lower than that of the cladding and/or lower than that of the combination of the core and cladding. In this manner, in the production of the fiber, a compressive stress is built up in the sheath, which makes the fiber insensitive to tensile and flexural stress.

However, a process is also already known from DE-OS 27 27 054, in which, in order to increase the tensile strength of a glass fiber, there has been additionally applied to the cladding of a fiber preform at least one protective layer of a glass material, which has a lower coefficient of thermal expansion as compared with the adjoining glass material of the fiber preform or fiber. In order to achieve this, a glass based on silicon dioxide which is doped with one or more oxides of the chemical elements lithium, sodium, magnesium, calcium, boron and others is used for the protective layer. The glass preform provided with a protective layer of this type is drawn to a fiber in a fiber drawing machine at the usual drawing temperatures of approximately 2000° C.

In another known glass fiber described in DE OS 28-26 010, in order to increase the tensile strength, the outer sheath consists of at least one layer which, because of its low coefficient of thermal expansion as compared with the cladding, exerts pressure on the fiber-optical structure. Because, in this case, the difference between the two coefficients of thermal expansion should be as large as possible, metal layers are also used to achieve the desired effect, with particular consideration given to the use of aluminum and tin.

However, the mechanical properties of glass fiber optical waveguides prepared in this manner do not meet the requirements which result when optical waveguides of this type, spooled in unwindable lengths, are used for the remote control of instruments and systems.

SUMMARY OF THE INVENTION

Starting from the prior art described, the invention is therefore based on the object of finding possibilities leading to an increase in breaking strength, improvement in aging stability, and immobilization of micro-cracks.

According to the invention, this object is achieved by the fact that the fiber is drawn cold from the preform with increased tensile force. The invention is based on the finding that the measures taken so far, namely the production of compressive stresses by means of suitable outer sheaths and drawing of the fiber at temperatures above 2000° C., do indeed lead to an increase in tensile strength, but the values achieved in this way are not sufficient if special requirements are to be applied to the fibers. If, however, as provided for in the invention, the fiber is drawn from the preform in the cold state, very high compressive stresses are produced in the peripheral region of the fiber, which are many times higher than the compressive stresses of the preform. The cold state is, for example, a temperature range close to the particular glass melting point, in which case the tensile force required for this purpose is set to a high level. During the drawing process, therefore, the inner region of the multi-layer preform structure always shows a higher viscosity than the outer region which serves as a sheathing. This, of course, applies only to the site at which the stresses are generated within the so-called drawing bulb at the heated end of the preform, formed by the drawing process. The tensile stress applied to the fiber from the outside is thus frozen in the interior region with decreasing glass temperature, while the cross-section of the outer layers or of the outermost sheathing still has a viscosity that is too low for the impression of forces.

Fibers prepared from a glass preform with an outer layer or an outer sheath of a material with a lower coefficient of thermal expansion as compared with the material of the preform therefore has applied to it a tensile force of 70–200 cN, preferably 90–150 cN, during the drawing process. Higher tensile stresses lead to higher compressive stresses in the peripheral region of the fiber and, thus, to higher tensile stresses in the remaining cross-section of the fiber. As a result of the compressive stresses on the periphery of the fiber, the size distribution of micro-cracks at the surface of the fiber is at a low level, as a result the fibers according to the invention have an increased breaking strength.

As explained in the prior art cited, the additional sheathing applied over the preform cladding consists of the same base material as the preform itself, with this base glass material being doped with any desired element in order to achieve a lower coefficient of thermal expansion. In contrast to this, the invention, as an additional idea, provides that a synthetic quartz glass be used as a material for the layer or layers of the glass material with a lower coefficient of thermal expansion. The measures taken according to the invention, namely cold drawing at extremely high tensile stress values in conjunction with the synthetic quartz glass, lead to particularly high-grade fibers, which meet mechanical requirements even when such fibers are wound in long lengths and are used for the control of instruments or systems.

The synthetic quartz glass can, for example, be doped with chlorine, which contributes to the different expansion behavior of the synthetic as compared with the natural glass material, which is the cause for compressive stresses at the periphery of the preform, which can also be measured in the fiber itself.

By doping the glass materials used with foreign substances, the coefficients of thermal expansion are adjustable over a wide range, but the difference between the reciprocal expansion coefficients should be at least 4–6 percent in order to ensure that the compressive stresses at the fiber surface which are a prerequisite for the desired tensile strengths in the fiber are present during the drawing process.

Furthermore, the advantage of a fiber that is under high compression in the peripheral region is to be seen not only in higher strength of the fiber itself as compared with known fiber types, but also in the fact that the drawing furnace used for manufacture can be run in a more cost-effective manner, for example, because of the lower drawing temperatures required. This feature is in stark contrast to the manufacturing process for fibers known from the prior art in which, as also stated there, the fibers must be drawn at high temperatures in order to keep the micro-cracks on the glass surface small.

DESCRIPTION OF THE PREFERRED EMBODIMENT

The exemplifying embodiment relates to a glass fiber optical waveguide, drawn from a preform in accordance with the characteristics of the invention. The preform is produced by internal coating of a substrate tube and subsequent collapse of this tube. A so-called sleeving tube, made of a material with a lower coefficient of thermal expansion as compared with the substrate tube, is then slid over the collapsed substrate tube. In the present exemplifying embodiment, a synthetic quartz glass doped with chlorine was used as the material for the sleeving tube.

Figure 1:
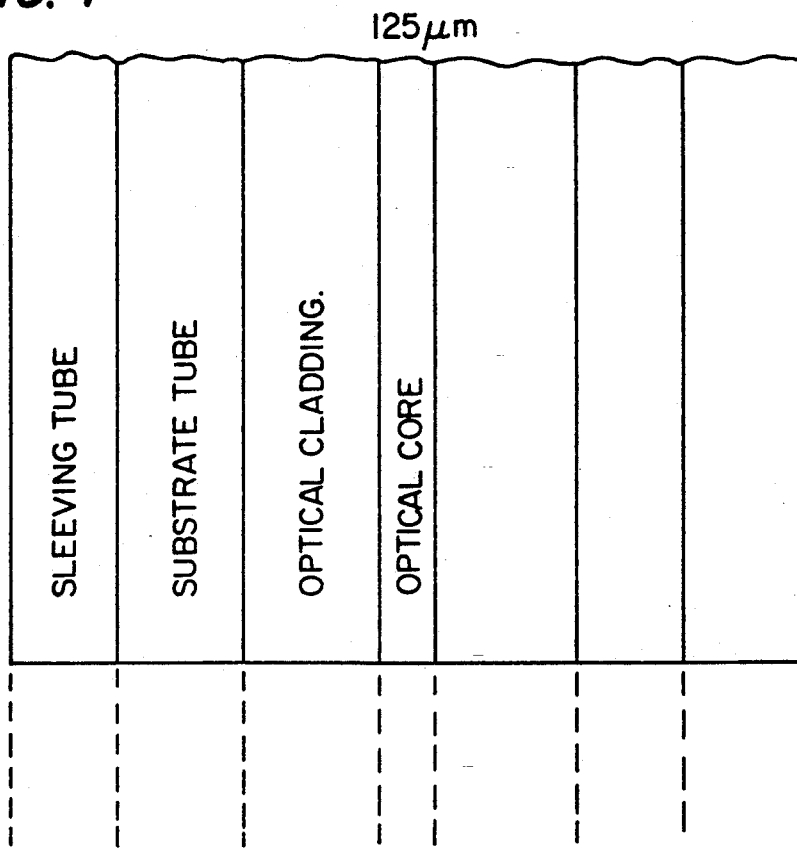
FIG. 1 shows a cross-section of the waveguide of the present invention.

The aforesaid construction of a fiber according to the invention, for example, with a fiber cross-section of 125 um, is shown in FIG. 1. In this figure, in the interior of the fiber is the optical core, over which the individual layers deposited from the gas phase are arranged to form the optical cladding. Above this is arranged the substrate tube, which, initially coated both with the core and with the cladding material, has been collapsed to form the preform. The fiber surface is finally formed by means of the layer of material with a lower coefficient of thermal expansion, as compared with the substrate tube, used in accordance with the invention, which in the present case is the above-mentioned synthetic glass. The layer of material with a lower coefficient of thermal expansion can be applied as a sleeving tube or applied as a powder which is subsequently sintered.

Figure 2:
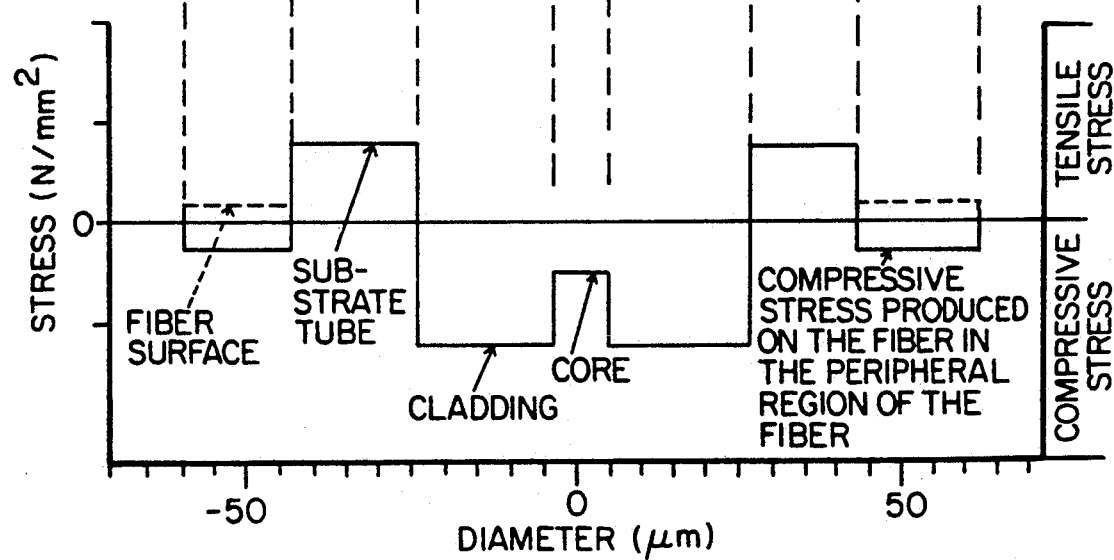
FIG. 2 is a graph illustrating the stresses in the layers of FIG. 1.

FIG. 2 shows the change in fiber stress over the whole fiber cross-section, with reference to the individual layers in the fiber cross-section formed by the core, the cladding, the substrate tube and the sheathing formed of a sleeving tube. As already stated, the essential feature of the process according to the invention is to be seen in the fact that the fiber is drawn from the preform in the cold state with increased tensile force, for example, between 90 and 150 cN. As can be seen from FIG. 2, these measures, in contrast to known processes, create high compressive stresses in the region of the fiber surface, which are many times greater than the compressive stresses of the preform. The high compressive stresses in the peripheral region of the fiber result from the low softening temperature of the material of the sleeving tube as compared with the higher softening temperature of the optical core, the optical cladding, and the substrate tube.

As a result of the compressive stresses in the peripheral region of the fiber, which can be seen from FIG. 2, the micro-crack size distribution at the fiber surface is at a very low level, and the fibers thus have a high breaking strength. If, on the other hand, as has previously been done with the known processes, a conventional fiber is produced by drawing from a preform, then this fiber, with impressed tensile stresses in the peripheral region (as is shown by the broken line of the fiber stress diagram in FIG. 2 in the region of the sleeving tube) has a strength in the peripheral region which decreases as the tensile force during the drawing process increases. The breaking strength measured for a fiber is increased in proportion to the impressed compressive strength, since it counteracts the tensile stress applied from outside. If, on the other hand, as has been conventional in the past, tensile stresses are impressed in the peripheral region, i.e., in the region of the sleeving tube, then these tensile stresses in the peripheral region are further increased in proportion to tensile stresses applied from the outside.

WHAT IS CLAIMED IS:

1. A process for preparing a glass fiber optical waveguide with increased tensile strength comprising the steps of:
    A. providing a glass preform with a core and an outermost sheathing layer of a glass material, the glass material of the outermost layer has a lower coefficient of thermal expansion as compared with material underneath the outermost layer;
    B. heating at least a portion of the glass preform to a temperature close to a melting temperature of the glass material; and
    C. drawing a glass fiber optical waveguide from the heated portion of the preform using an increased tensile force in the range of 70 to 200 cN.

2. A process according to claim 1, wherein the tensile force used during the drawing step has a value between 90 and 150 cN.

3. A process according to claim 1, wherein the tensile force during the drawing step has a value between 70 and 100 cN.

4. A process according to claim 1, wherein a synthetic quartz glass is used as the material for the outermost layer of glass material with a lower coefficient of thermal expansion.

5. A process according to claim 4, wherein the synthetic quartz glass is doped with a doping component.

6. A process according to claim 5, wherein chlorine is used as the doping component.

7. A process according to claim 1, wherein the core of the preform comprises an internally coated and collapsed glass tube that is covered by the outermost layer with the difference between reciprocal coefficients of thermal expansion of the glass tube and the outermost layer being at least 4 to 6 percent.

8. A process according to claim 1, wherein the outermost layer with the lower coefficient of thermal expansion is a pre-fabricated sleeving tube.

9. A process according to claim 1, wherein the outermost layer with the lower coefficient of thermal expansion comprises a glass material applied onto the preform in powder form and then sintered.

10. A process according to claim 1, wherein a synthetic quartz glass is used as the material for the outermost layer with the lower coefficient of thermal expansion.

11. A process according to claim 10, wherein the synthetic quartz glass is doped with a doping component.

12. A process according to claim 11, wherein chlorine is used as the doping component.

* * * * *

UNITED STATES PATENT AND TRADEMARK OFFICE
CERTIFICATE OF CORRECTION

PATENT NO. : 5,242,476
DATED : September 7, 1993
INVENTOR(S) : Ulrich Bartel and Bernd Lange It is certified that error appears in the above-identified patent and that said Letters Patent is hereby corrected as shown below:

On the Title page, item [22], change "1992" to --1991--.

Signed and Sealed this

Twenty-ninth Day of March, 1994

Attest:

BRUCE LEHMAN

Attesting Officer     Commissioner of Patents and Trademarks